M. KÜLLER.
REMOVABLE RIM ATTACHMENT FOR VEHICLE WHEELS.
APPLICATION FILED AUG. 28, 1912.
1,088,349.
Patented Feb. 24, 1914.
2 SHEETS—SHEET 1.
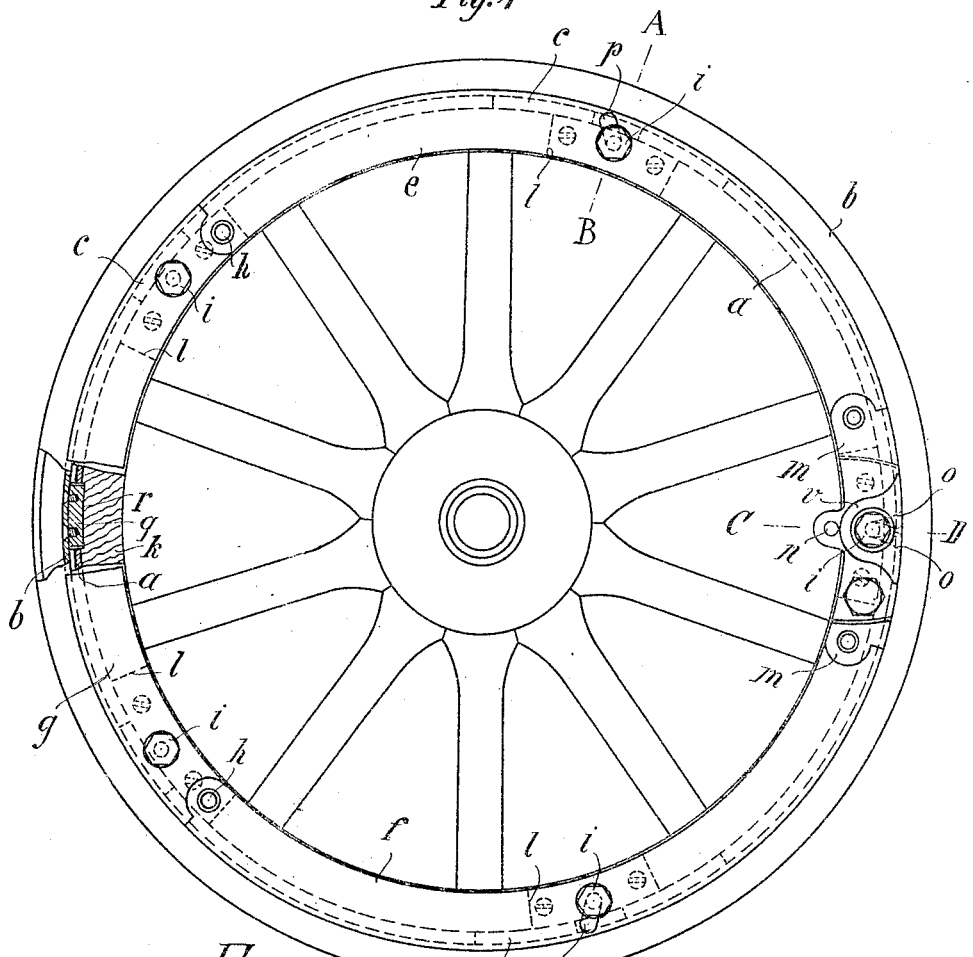
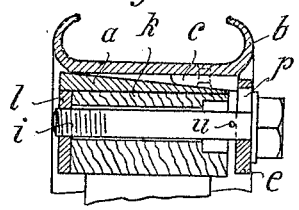
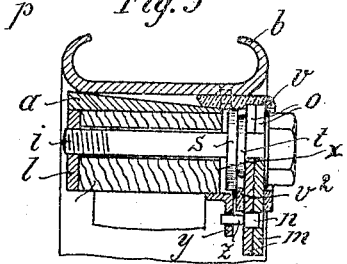
Witnesses
Wm F. Davidson
H. E. Bready
Inventor
Max Küller
By Percy H. Moore
Atty.

M. KÜLLER.
REMOVABLE RIM ATTACHMENT FOR VEHICLE WHEELS.
APPLICATION FILED AUG. 28, 1912.
1,088,349.
Patented Feb. 24, 1914.
2 SHEETS—SHEET 2.
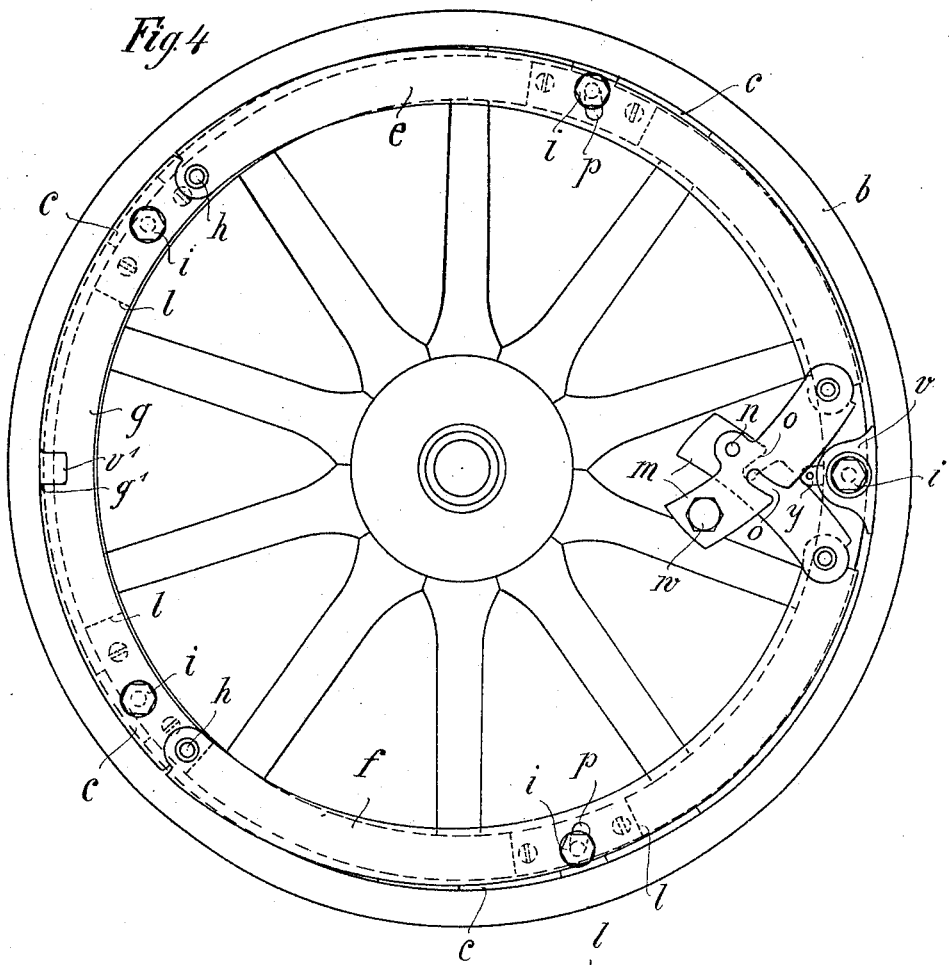
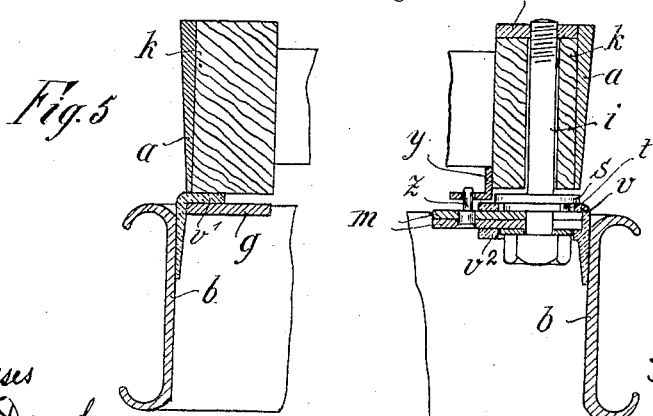

UNITED STATES PATENT OFFICE.

MAX KÜLLER, OF GROSS-LICHTERFELDE, NEAR BERLIN, GERMANY.

REMOVABLE RIM ATTACHMENT FOR VEHICLE-WHEELS.

1,088,349.  Specification of Letters Patent.  Patented Feb. 24, 1914.

Application filed August 28, 1912. Serial No. 717,457.

*To all whom it may concern:*

Be it known that I, MAX KÜLLER, a citizen of the German Empire, residing at Gross-Lichterfelde, near Berlin, German Empire, have invented certain new and useful Improvements in Removable Rim Attachments for Vehicle-Wheels, of which the following is a full, clear, and exact description.

The present invention relates to that class of vehicle wheels having a removable rim, which is attached to the wheel proper by means of an expansible metal ring provided with toggle plates, which are subsequently locked in position.

One of the main objects of the invention is to attach the rim with the pneumatic tire in such manner, that it can be easily placed on the wheel or removed from the same without having to take out any bolts or screws.

A further object of the invention is to provide suitable means for locking the toggle plates in their closed position.

A further object is to enable the removable rim to be attached to the side of the wheel proper to facilitate changing the pneumatic tire, as hereinafter more particularly set forth.

In the accompanying drawings, in which similar reference letters denote similar parts throughout the several views, Figure 1 is a plan view of the wheel, showing the rim locked in position on the same; Figs. 2 and 3 are sections through the rim and felly along the line A—B and C—D respectively of Fig. 1. Fig. 4 is an elevation of the wheel, showing the toggle plates unlocked and Fig. 5 is a cross section taken through opposite sides of the rim and felly of the wheel, showing the removable rim attached to the side of the wheel.

The felly band $a$ is made conical on its outer surface and the rim $b$ to which the pneumatic tire is attached in a known manner is placed on to this conical surface. The interior surface of the rim $b$ is advantageously provided with a number of wedge-shaped pieces $c$, which engage the conical exterior surface of the felly band $a$. The edge $d$ of the rim $b$ which lies opposite to the wedges $c$ rests against the conical edge of the felly band, so that when the rim is being tightened up on the wheel, the edge $d$ will be pushed on to the conical surface of the felly band $a$ so that the said rim will be supported evenly at both edges, the edge $d$ engaging the conical part of the felly band, while the opposite of the latter is engaged by the wedges $c$, as will be readily understood.

In order to fix the removable rim to the wheel an expansible ring, consisting of several sections $e$ $f$ and $g$ is provided, the sections $e$ and $f$ being movable and hinged by means of bolts $h$ $h$ to the fixed section $g$ of the ring. The movable sections $e$ and $f$ are thus capable of a limited movement inwardly toward the center of the wheel. The whole ring $e$ $f$ $g$ fits against the outer side of the removable rim or against the outer side of the wedges $c$ of the same and may be pressed on to the same by means of studs $i$, the opposite or threaded ends of which engage a metal ring $l$ (Figs. 2 and 3) at the opposite side of the felly, passing through the wooden felly $k$. The two sections $e$ and $f$ of the clamping ring are connected up by toggle plates $m$ $m$, hinged together by means of a hinge-pin $n$ and having at their adjacent ends open slots $o$ (Fig. 4), which embrace the stud $i$. The open slots of the toggle plates $m$ $m$ provide the advantage that these plates may be brought into and out of engagement with the stud $i$ without having to take out the latter. The movable sections $e$ and $f$ embrace their studs $i$ by means of slots $p$ which enable a limited movement of the said sections inwardly when the toggle plates have been unlocked, also without the necessity of removing the said studs $i$.

In order to determine the proper position of the rim $b$ on the felly band $a$, the former is provided with a metal plate $q$ (Fig. 1), which is adapted to enter a corresponding opening $r$ of the felly. This plate is also advantageously employed for the reception of the valve of the pneumatic tire.

The toggle plates $m$ move between two downwardly extending flanges $v^2$ of a wedge piece suitably attached to the inside of the rim $b$, the said toggle plates being guided between the part $t$ of the disk $t$ $s$ and the nut or head of the stud $i$. The part $s$ of the disk $s$ $t$ is of greater diameter than $t$ and adapted to press against the interior surface of the inner flange $v^2$ of the wedge piece $v$ $v^2$. When, therefore, the slotted toggle plates $m$ are removed from the stud $i$ into the position illustrated in Fig. 4 and if the stud $i$ is now unscrewed, the part $s$ of the collar will press against the inner surface of the flange $v^2$ raising or loosening the same from the conical surface of the felly band $a$. On loosening the other studs $i$ (Fig. 2) a cross pin $u$ presses against the inner surface of the section $e\ f\ g$, also raising them and greatly facilitating the removal of the rim $b$ from the felly band $a$.

A small plate extending downwardly in the plane of the wheel is attached to the felly and forms an eye $y$ as will be seen from Fig. 3, with which a pin $z$ forming an extension of the hinged pin $n$ comes into engagement as the parts are tightened up and thus locks the toggle plates in their closed position.

The attachment and detachment of the removable rim is effected in the following manner:—If the rim is to be taken off the wheel, the studs of the sections $e$ and $f$ are slightly loosened and then the stud $i$ provided with or having formed thereon the collar $s$ on loosening the top stud $i$ will press against the downwardly extending flange $v^2$ (Fig. 3) of the rim, thus loosening the same of the conical surface of the felly band and disengaging the pin $z$ from the eye $y$. By means of a spanner or the like and the bolt head $w$ on one of the toggle plates $m$, the toggle joint is now thrown open in the position shown in Fig. 4. The movable sections $e$ and $f$ are then moved inwardly, so that the sides of the wedge, against which they act, are disengaged and the upper part of the rim $b$ may be taken off the felly band and then the lower part detached from the same. If it is desired to fix the rim on the felly, the plate $q$ at the lower part of the same is first brought into engagement with the opening $r$ of the felly (Fig. 1) and the whole rim is then pushed over the conical part of the felly band, the sections $e$ and $f$ being in their contracted position and the toggle plates $m$ unlocked, as shown in Fig. 4. The sections $e$ and $f$ are then expanded and the slots $o$ of the toggle plates adjusted to embrace the stud $i$, which is then screwed up, causing the pin $z$ (Fig. 3) to engage the eye $y$, whereby the parts are locked in position and the rim is firmly secured to the felly band. When the rim $b$ has been tightly fixed to the felly band $a$ a small space $x$ (Fig. 3) is allowed to remain between the inner surface of the ring $e\ f\ g$ and the outer surface of the wooden part $k$ of the felly so that in the event of the rim $b$ becoming loose in time, there will be room for it to be tightened up by means of the studs. The felly band $a$ is of such width in cross-section on comparison with the rim $b$ (Figs. 2 and 3) as to enable the latter to be tightened up continually on the former as it gets warm.

The removable rim $b$ is provided with an inwardly turned flange $v'$ at a point about diametrically opposite to the toggle plates $m$ and the rigid or stationary section $g$ is provided with a recess $g'$ into which the flange $v'$ may pass. When it is required to fix the rim to the side of the wheel, in order to attach a new pneumatic tire to the same, as illustrated in Fig. 5, the flange or projection $v'$ is inserted into the recess $g$ and the double flange $v\ v^2$ is passed over the head of the stud $i$ from the opposite side and the toggle members $m$ are moved to engage the said stud $i$, when on tightening up the stud, the rim will be secured temporarily in the position shown in Fig. 5 and the tire may be placed on the same. After this has been done, the rim is again removed and placed upon the felly in the proper position.

I claim as my invention:—

1. In a vehicle wheel having a removable rim, means for locking said rim in position, comprising a distendible clamping ring attached to the felly of said wheel comprising fixed and movable sections, said movable sections being connected by means of slotted toggle plates and studs carried by said felly co-acting with the slots, in said toggle plates.

2. In a vehicle wheel having a removable rim, the combination with said rim of means for attaching the same comprising a distendible ring attached to the felly of said wheel having fixed and movable sections studs carried by said felly midway between said movable sections and toggle plates pivoted on said movable sections and to one another adapted to co-act with said studs.

3. In a vehicle wheel having a removable rim, means for locking said rim in position on said wheel, comprising a distendible ring attached to the felly of said wheel, said ring having fixed and movable portions relative to said felly, means for connecting said movable portions comprising slotted toggle plates pivotally secured to said movable portions and to one another, and a stud carried by said felly adapted to coöperate with the slots in said toggle plates and lock said ring in a distended position.

In testimony whereof I affix my signature in the presence of two witnesses.

MAX KÜLLER.

Witnesses:
 WOLDEMAR HAUPT,
 HARRY L. WILSON.